(12) United States Patent
Lai et al.

(10) Patent No.: US 7,760,277 B2
(45) Date of Patent: Jul. 20, 2010

(54) ACTIVE MATRIX LCD PANEL WITH FIRST AND SECOND ALIGNMENT LAYERS HAVING RESPECTIVELY PLURAL FIRST AND SECOND GROOVES THAT EXTEND RESPECTIVELY ALONG TEN AND ONE O'CLOCK DIRECTIONS THEREON WHEN VIEWED FROM ABOVE

(75) Inventors: Chi-Kuang Lai, Miao-Li (TW); Chi-Yuan Lu, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 531 days.

(21) Appl. No.: 11/636,149

(22) Filed: Dec. 7, 2006

(65) Prior Publication Data

US 2007/0126953 A1 Jun. 7, 2007

(30) Foreign Application Priority Data

Dec. 7, 2005 (CN) .................... 2005 1 0102308

(51) Int. Cl.
*G02F 1/1343* (2006.01)
(52) U.S. Cl. .................... 349/39; 349/110; 349/123
(58) Field of Classification Search .......... 349/38, 349/39, 54, 55, 110, 111, 106, 123
See application file for complete search history.

(56) References Cited

U.S. PATENT DOCUMENTS

| 6,331,845 | B1 * | 12/2001 | Kitajima et al. ............. 345/88 |
| 6,791,631 | B2 | 9/2004 | Cheng et al. |
| 7,139,057 | B2 * | 11/2006 | Lee ........................... 349/139 |
| 2002/0060756 | A1 * | 5/2002 | Kurashina .................. 349/39 |
| 2003/0107687 | A1 | 6/2003 | Choo et al. |
| 2003/0160918 | A1 * | 8/2003 | Rho .......................... 349/113 |
| 2004/0263710 | A1 * | 12/2004 | Song et al. .................. 349/44 |

* cited by examiner

*Primary Examiner*—John Heyman
(74) *Attorney, Agent, or Firm*—Wei Te Chung

(57) ABSTRACT

An exemplary active matrix liquid crystal display (AMLCD) panel (20) includes a first substrate (400), a second substrate (600), and a liquid crystal layer (500) sandwiched between the two substrates. The second substrate includes gate lines that are parallel to each other, common lines that are alternate with and parallel to the gate lines, and data lines that are parallel to each other and crossing to the gate lines. The data lines cross the gate lines to define pixel regions. Each of the pixel regions includes a pixel electrode that is between the data lines, a first shielding metal line positioned at a side of the pixel electrode, a second shielding metal line positioned at another side of the pixel electrode. The second shielding metal line is connected to the common line. The first shielding metal line is an electrically floating body.

16 Claims, 4 Drawing Sheets

ACTIVE MATRIX LCD PANEL WITH FIRST AND SECOND ALIGNMENT LAYERS HAVING RESPECTIVELY PLURAL FIRST AND SECOND GROOVES THAT EXTEND RESPECTIVELY ALONG TEN AND ONE O'CLOCK DIRECTIONS THEREON WHEN VIEWED FROM ABOVE

FIELD OF THE INVENTION

The present invention relates an active matrix liquid crystal display (AMLCD) panel having a pair of shield metal lines, one of which is floating.

GENERAL BACKGROUND

An AMLCD device has the advantages of portability, low power consumption, and low radiation, and has been widely used in various portable information products such as notebooks, personal digital assistants (PDAs), video cameras and the like. Furthermore, the AMLCD device is considered by many to have the potential to completely replace CRT (cathode ray tube) monitors and televisions.

Referring to FIG. 4 and FIG. 5, a typical AMLCD panel 10 of an AMLCD device includes a color filter (CF) substrate 100, a thin film transistor (TFT) substrate 300, and a liquid crystal layer 200 sandwiched between the two substrates 100, 300. The AMLCD panel 10 is a twisted nematic (TN) LCD panel, and works in a so-called "normally white" mode.

The CF substrate 100 includes a first glass substrate 101, a first polarizer 106, a black matrix 105, a color filter unit film 103, a common electrode layer 104, and a first alignment layer 102. The first polarizer 106 is formed on an outside surface of the first glass substrate 101. The black matrix 105 and the color filter unit film 103 are formed on an internal surface of the first glass substrate 101 nearest to the liquid crystal layer 200. The color filter unit film 103 includes a plurality of red color filter units (R), a plurality of green color filter units (G), and a plurality of blue color filter units (B). The red color filter units (R), the green color filter units (G), and the blue color filter units (B) are positioned on the first glass substrate 101 in a predetermined arrangement, and are separated from each other by the black matrix 105. The common electrode layer 104 is formed on the black matrix 105 and the color filter unit film 103. The first alignment layer 102 is formed on a surface of the common electrode layer 104 nearest to the liquid crystal layer 200. The first alignment layer 102 includes a plurality of first grooves (not shown) that extend along a ten o'clock direction of the AMLCD panel 10 when the AMLCD panel 10 is viewed from above (corresponding to the view of FIG. 4).

The TFT substrate 300 includes a second glass substrate 301, a second polarizer 305, a second alignment layer 303, a plurality of gate lines 306 that are parallel to each other and that each extend along a first direction, a plurality of common lines 316 that are arranged parallel to and alternate with the gate lines 306, a plurality of data lines 308 that are parallel to each other and that each extend along a second direction orthogonal to the first direction, a plurality of thin film transistors (TFTs) 302 each of which is provided in the vicinity of a respective point of intersection of one of the gate lines 306 and one of the data lines 308, a plurality of pixel electrodes 304, a plurality of first shield metal lines 320 electrically connected to the common lines 316, a plurality of second shield metal lines 321 electrically connected to the common lines 316, and a plurality of through holes 331.

The second polarizer 305 is formed on an outside surface of the second glass substrate 301. The second alignment layer 303 is positioned adjacent to the liquid crystal layer 200. The second alignment layer 303 includes a plurality of second grooves (not shown) that extend along a one o'clock direction of the AMLCD panel 10 when the AMLCD panel 10 is viewed from above.

The gate lines 306, the common lines 316, the data lines 308, the TFTs 302, the pixel electrodes 304, the first shield metal lines 320, and the second shield metal lines 321 are formed at an internal surface of the second glass substrate 301 nearest to the liquid crystal layer 200. The gate lines 306 cross the data lines 308, thereby define a plurality of pixel regions (not labeled).

In each pixel region, the TFT substrate 300 includes a pair of data lines 308, a pair of gate lines 306, a common line 316, a TFT 302 which functions as a switching element, a pixel electrode 304, a pair of first and second shield metal lines 320, 321, and a through hole 331. The TFT 302 includes a gate electrode 302b connected to one of the pair of gate lines 306, a source electrode 302a connected to one of the pair of data lines 308, and a drain electrode 302c connected to the pixel electrode 304 via the through hole 331. The pair of shield metal lines 320, 321 are adjacent and parallel to the pair of data lines 308 respectively. That is, the pair of shield metal lines 320, 321 are located at two opposite sides of the pixel electrode 304 respectively. The second shield metal line 321 partly overlaps the pixel electrode 304 to form a first capacitor 311. The first shield metal line 320 partly overlaps the pixel electrode 304 to form a second capacitor 312. The common line 316 includes an ear part (not labeled), which partly overlaps the pixel electrode 304 to form a third capacitor 310.

FIG. 6 is a voltage-transmittance diagram which represents a relationship between light transmittance of a pixel unit of the AMLCD 10 and a gradation voltage applied to the pixel unit. The first grooves of the first alignment layer 102 extend along the ten o'clock direction and the second grooves of the second alignment layer 303 extend along the one o'clock direction, thus an optical viewing angle of the AMLCD panel 10 extends along a three o'clock direction. When an electric field is applied to the AMLCD panel 10 in order to provide a black image viewed on a display screen of the AMLCD panel 10, liquid crystal molecules 211 of the liquid crystal layer 200 should align perpendicular to the two substrates 100, 300. However, when an electric field generated by voltages respectively provided by the pixel electrode 304, the data line 308, the common electrode 104, the first shield metal line 320, and the second shield metal line 321 is applied to the liquid crystal molecules 211 between the two substrates 100, 300, a light-leakage region (not labeled) may appear near the black matrix 105. The light-leakage region includes a first light-leakage area 210, a second light-leakage area 212, and a third light-leakage area 214. Liquid crystal molecules 211 in the first, second and third light-leakage areas 210, 212, 214 are arranged as shown.

The first light-leakage area 210 and the second light-leakage area 212 are positioned below the black matrix 105. The liquid crystal molecules 211 in the first and second light-leakage areas 210, 212 are aligned parallel to the two substrates 100, 300. The third light-leakage area 214 is adjacent to the second light-leakage area 212, and is not covered by the black matrix 105. The liquid crystal molecules 211 in the third light-leakage area 214 are also aligned parallel to the two substrates 100, 300. Thus light penetrates the AMLCD panel 10 in the light-leakage region, and the arrayed combination of the pixel colors provides an impaired image viewed on the AMLCD panel 10. The light penetrating the first and the second light-leakage areas 210, 212 may be blocked by the black matrix 105 above the first and the second light-leakage areas 210, 212.

However, in order to block the light penetrating the third light-leakage area 214, an area (or a width) of the black matrix 105 would need to be increased. If the black matrix 105 is configured thus, an aperture ratio of the AMLCD 10 is correspondingly reduced.

What is needed, therefore, is an AMLCD panel that can overcome the above-described deficiencies.

SUMMARY

In one preferred embodiment, an LCD panel includes a first substrate, a second substrate, and a liquid crystal layer sandwiched between the two substrates. The second substrate includes a plurality of gate lines that are parallel to each other and that each extend along a first direction, a plurality of common lines that are arranged parallel to and alternate with the gate lines, a plurality of data lines that are parallel to each other and that each extend along a second direction different from the first direction. The data lines cross the gate lines to define a plurality of pixel regions. Each of the pixel regions includes a pixel electrode that is between the data lines, a first shielding metal line positioned at a side of the pixel electrode, and a second shielding metal line positioned at another side of the pixel electrode. The second shielding metal line is connected to the common line. The first shielding metal line is floating and does not connect electrically to any other component or device.

Other advantages and novel features will become more apparent from the following detailed description when taken in conjunction with the accompanying drawings.

DETAILED DESCRIPTION OF PREFERRED EMBODIMENTS

Figure 1:
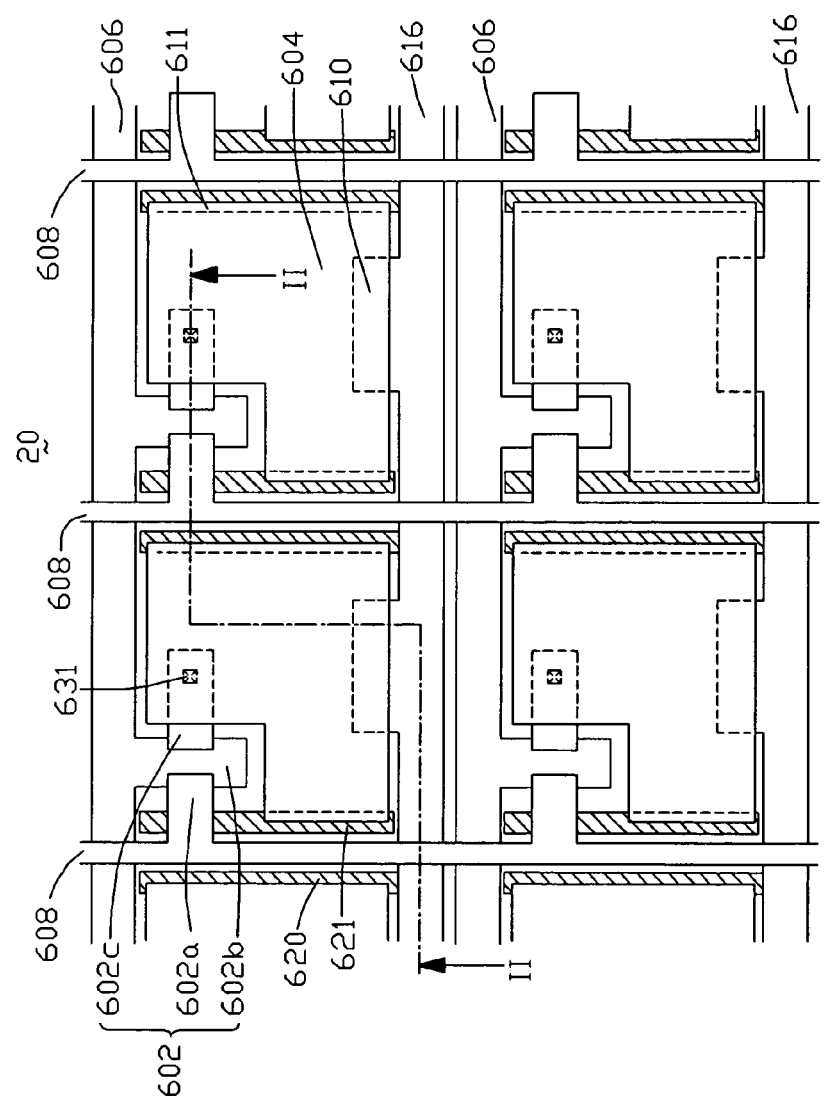
FIG. 1 is a top plan view showing certain parts of four pixel regions of a TFT substrate of an AMLCD panel according to an exemplary embodiment of the present invention.
Figure 2:
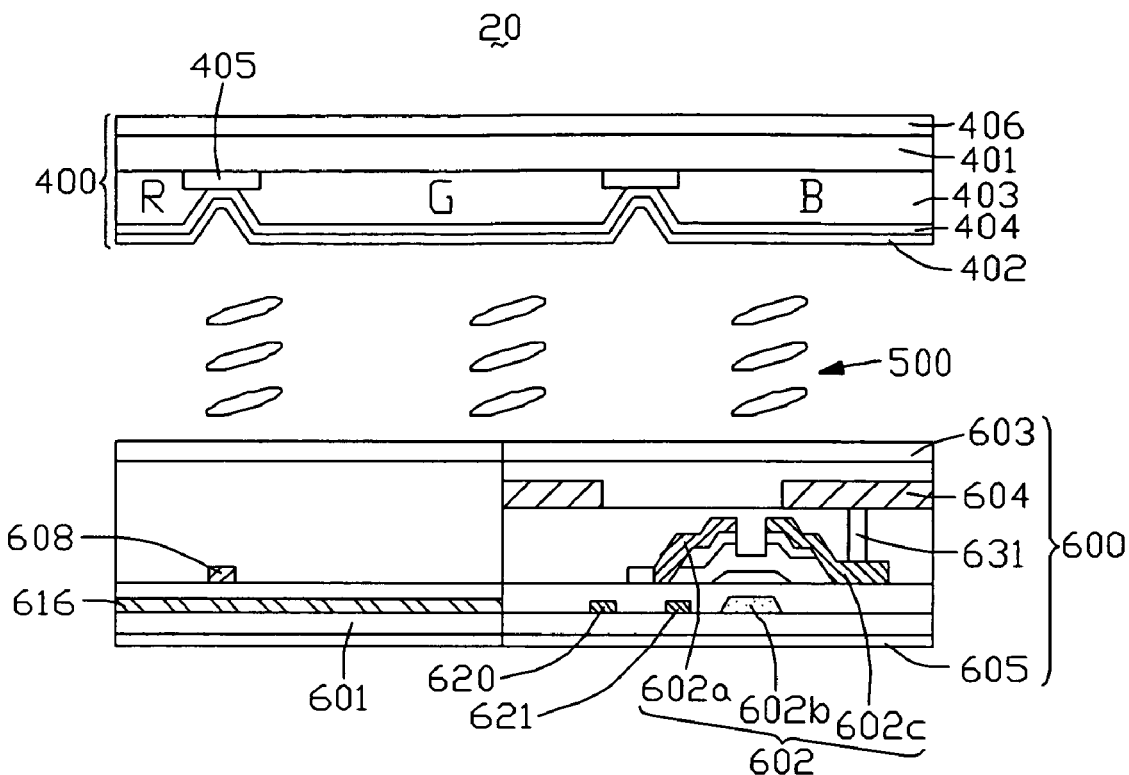
FIG. 2 is a cross-sectional view of part of the AMLCD panel according to the exemplary embodiment, corresponding to line II-II of FIG. 1.

Referring to FIG. 1 and FIG. 2, an AMLCD panel 20 according to an exemplary embodiment of the present invention includes a color filter (CF) substrate 400, a thin film transistor (TFT) substrate 600, and a liquid crystal layer 500 sandwiched between the two substrates 400, 600. The AMLCD panel 20 is typically a twisted nematic (TN) LCD panel, and works in a so-called "normally white" mode.

The CF substrate 400 includes a first glass substrate 401, a first polarizer 406, a black matrix 405, a color filter unit film 403, a common electrode layer 404, and a first alignment layer 402. The first polarizer 406 is formed on an outside surface of the first glass substrate 401. The black matrix 405 and the color filter unit film 403 are formed on an internal surface of the first glass substrate 401 nearest to the liquid crystal layer 500. The color filter unit film 403 includes a plurality of red color filter units (R), a plurality of green color filter units (G), and a plurality of blue color filter units (B). The red color filter units (R), the green color filter units (G), and the blue color filter units (B) are positioned on the first glass substrate 401 in a predetermined arrangement, and are separated from each other by the black matrix 405. The common electrode layer 404 is formed on the black matrix 405 and the color filter unit film 403. The first alignment layer 402 is formed on a surface of the common electrode layer 404 nearest to the liquid crystal layer 500. The first alignment layer 402 includes a plurality of first grooves (not shown) that extend along a ten o'clock direction of the AMLCD panel 20 when the AMLCD panel 20 is viewed from above (corresponding to the view of FIG. 1).

The TFT substrate 600 includes a second glass substrate 601, a second polarizer 605, a second alignment layer 603, a plurality of gate lines 606 that are parallel to each other and that each extend along a first direction, a plurality of common lines 616 that are arranged parallel to and alternate with the gate lines 606, a plurality of data lines 608 that are parallel to each other and that each extend along a second direction orthogonal to the first direction, a plurality of thin film transistors (TFTs) 602 each of which is provided in the vicinity of a respective point of intersection of one of the gate lines 606 and one of the data lines 608, a plurality of pixel electrodes 604, a plurality of first shield metal lines 620 electrically connected to the common lines 616, a plurality of second shield metal lines 621, and a plurality of through holes 631. The second shield metal lines 621 are 'floating', in that they are not electrically connected to any other component or device.

The second polarizer 605 is formed on an outside surface of the second glass substrate 601. The second alignment layer 603 is positioned adjacent to the liquid crystal layer 500. The second alignment layer 603 includes a plurality of second grooves (not shown) that extend along a one o'clock direction of the AMLCD panel 10 when the AMLCD panel 20 is viewed from above.

The gate lines 606, the common lines 616, the data lines 608, the TFTs 602, the pixel electrodes 604, the first shield metal lines 620, and the second shield metal lines 621 are formed at an internal surface of the second glass substrate 601 nearest to the liquid crystal layer 500. The gate lines 606 cross the data lines 608, thereby define a plurality of pixel regions (not labeled).

In each pixel region, the TFT substrate 600 includes a pair of data lines 608, a pair of gate lines 606, a common line 616, a TFT 602 which functions as a switching element, a pixel electrode 604, a pair of first and second shield metal lines 620, 621, and a through hole 631. The TFT 602 includes a gate electrode 602b connected to one of the pair of gate lines 606, a source electrode 602a connected to one of the pair of data lines 608, and a drain electrode 602c connected to the pixel electrode 604 via the through hole 631. The pair of shield metal lines 620, 621 are adjacent and parallel to the pair of data lines 608 respectively. That is, the pair of shield metal lines 620, 621 are located at two opposite sides of the pixel electrode 604 respectively. The first shield metal line 620 partly overlaps the pixel electrode 604 to form a first capacitor 611. The common line 616 includes an ear part (not labeled), which partly overlaps the pixel electrode 604 to form a second capacitor 610.

The first shield metal lines 620 and the second shield metal lines 621 are made of a material selected from the group consisting of molybdenum-tungsten alloy, chromium, and molybdenum. The black matrix 405 is made of a material selected from a group consisting of chromium and chromium oxide. The pixel electrode 604 and the common line 616 are made of a transparent material selected from the group consisting of ITO (Indium-Tin Oxide) and IZO (Indium-Zinc Oxide). The first substrate 401 and the second substrate 601 can be glass substrates or silicon oxide substrates.

Figure 3:
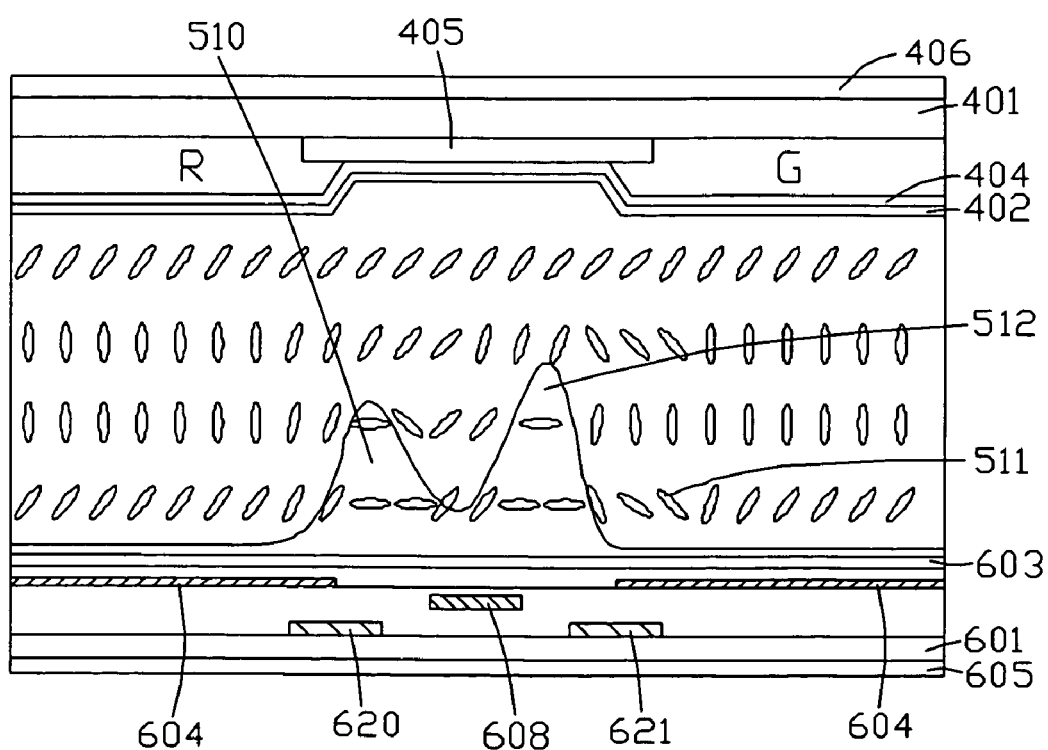
FIG. 3 is a voltage-transmittance diagram which represents a relationship between light transmittance of a pixel unit of the AMLCD panel of FIG. 1 and a gradation voltage applied to the pixel unit.
Figure 4:
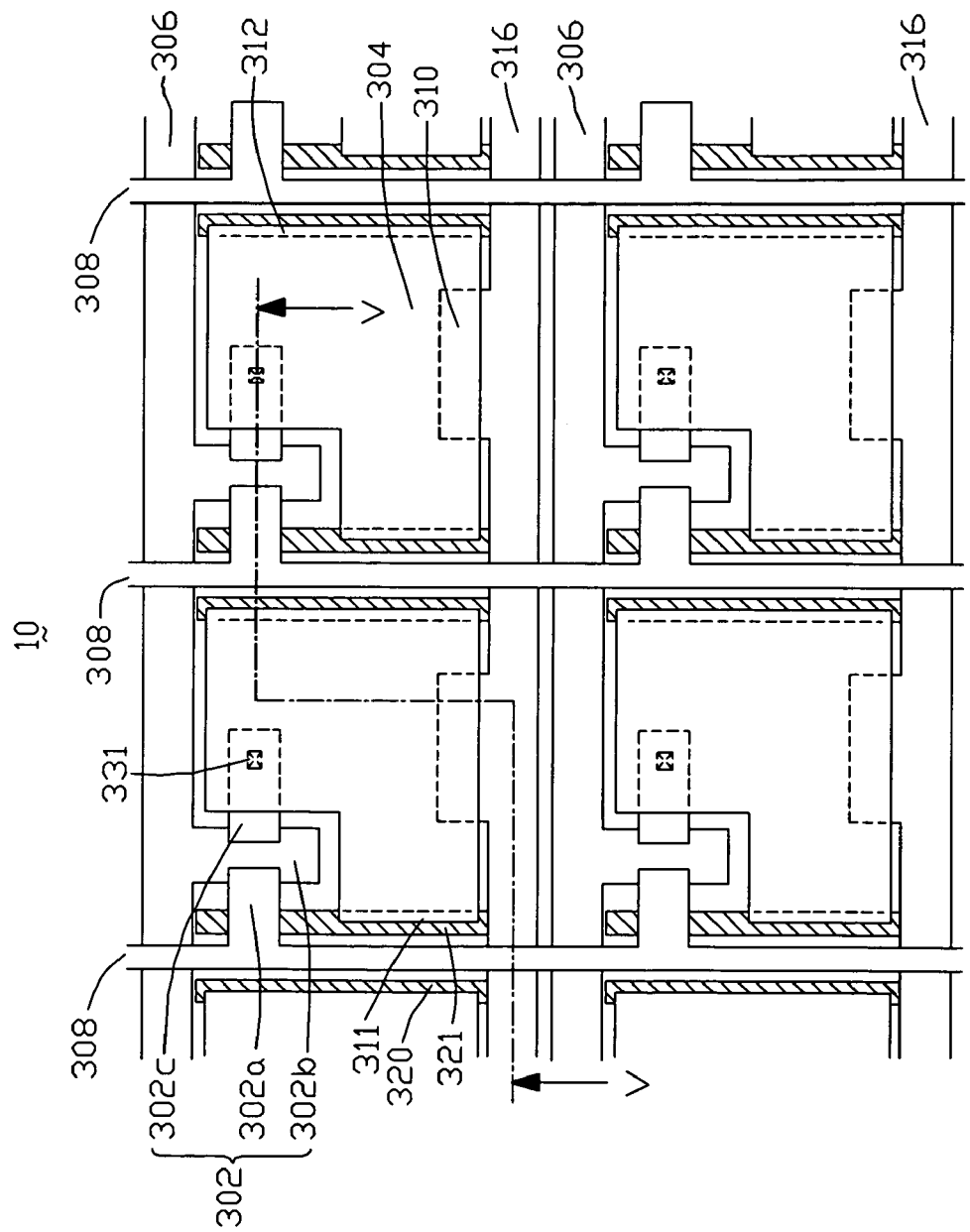
FIG. 4 is a top plan view showing four pixel regions of a TFT substrate of a conventional AMLCD panel.
Figure 5:
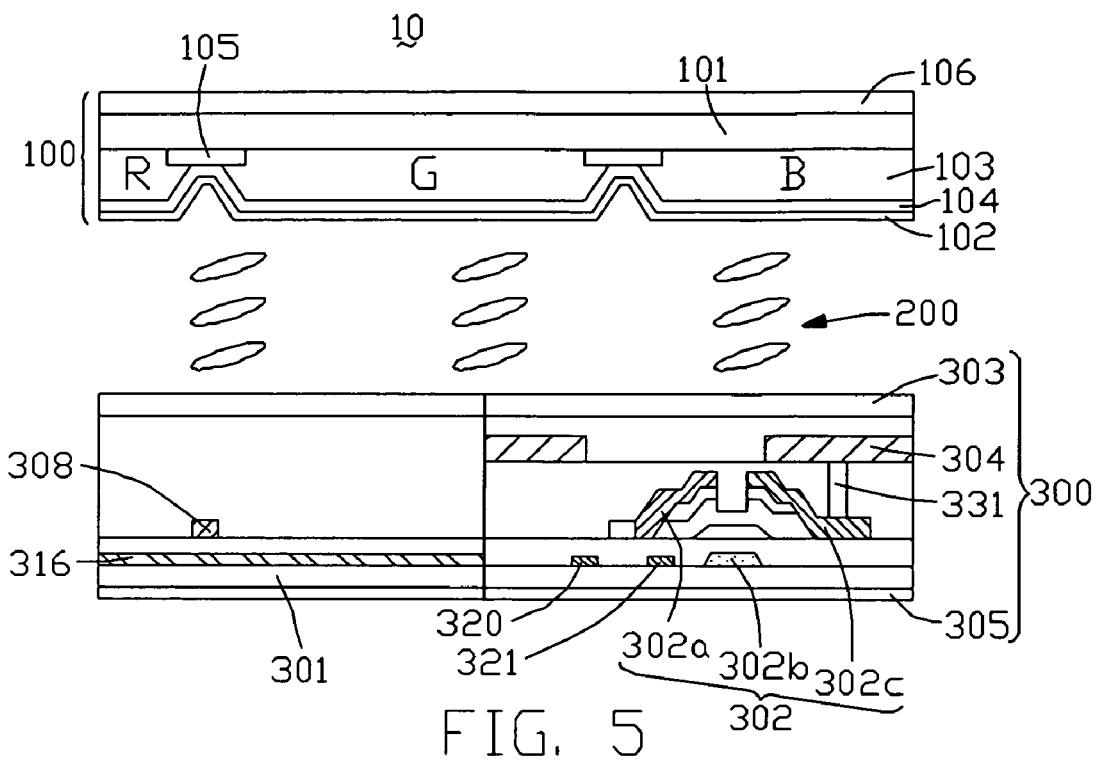
FIG. 5 is a cross-sectional view of part of the conventional AMLCD panel, corresponding to line V-V of FIG. 4.
Figure 6:
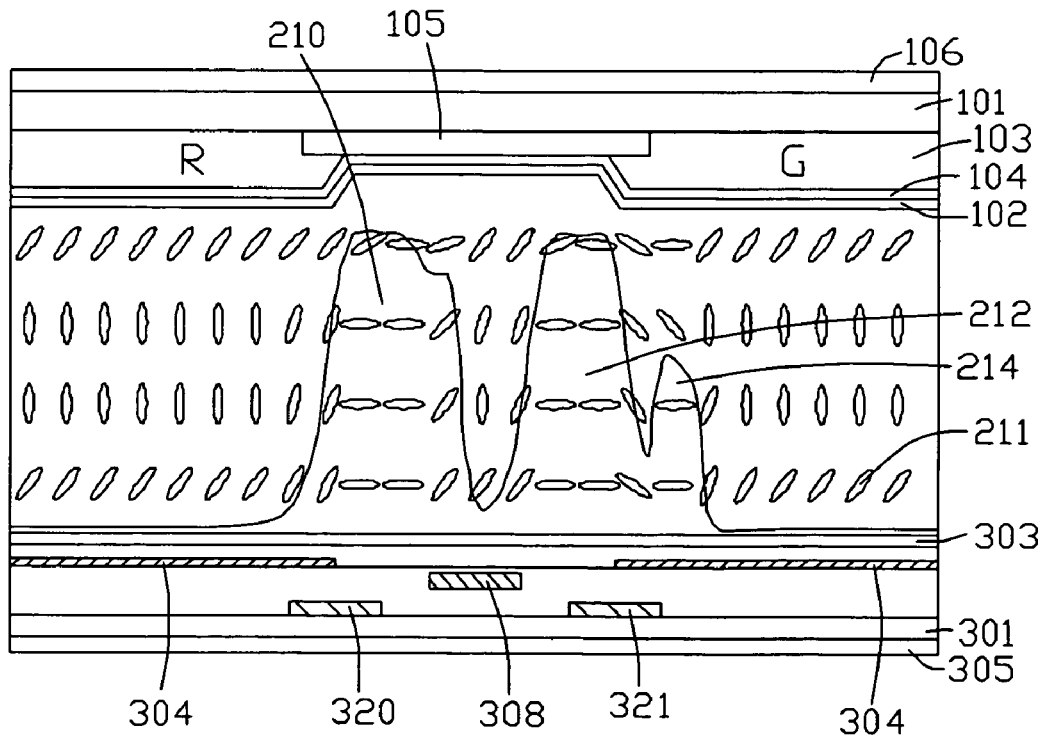
FIG. 6 is a voltage-transmittance diagram which represents a relationship between light transmittance of a pixel unit of the AMLCD panel of FIG. 4 and a gradation voltage applied to the pixel unit.

FIG. 3 is a voltage-transmittance diagram which represents a relationship between light transmittance of a pixel unit of the AMLCD panel 20 and a gradation voltage applied to the pixel unit. The first grooves of the first alignment layer 402 extend along the ten o'clock direction and the second grooves of the second alignment layer 603 extend along the one o'clock direction, thus an optical viewing angle of the AMLCD panel 20 extends along a three o'clock direction. When an electric field is applied to the AMLCD panel 20 in order to provide a black image viewed on a display screen of the AMLCD panel 20, liquid crystal molecules 511 of the liquid crystal layer 500 should align perpendicular to the two substrates 400, 600. However, an electric field generated by voltages respectively provided by the pixel electrode 604, the data line 608, the common electrode 404, the first shield metal line 620 is applied to the liquid crystal molecules 511 between the two substrates 400, 600, and a light-leakage region (not labeled) may appear under the black matrix 405. The light-leakage region includes a first light-leakage area 510 and a second light-leakage area 512. Liquid crystal molecules 511 in the first and second light-leakage areas 510, 512 are arranged as shown.

In the first light-leakage area 510 and the second light-leakage area 512, liquid crystal molecules 511 are aligned parallel to the two substrates 400, 600. But light penetrating the first and the second light-leakage areas 510, 512 can be blocked by the black matrix 405.

Because the first shield metal line 620 is electrically connected to the common lines 616 and the second shield metal line 621 is floating and cannot receive any voltage, the liquid crystal molecules 511 above the second shield metal line 621 are not influenced by a plane electric field generated by voltages respectively provided by the pixel electrode 604 and the second shield metal line 621. Therefore, an electric field generated by the voltages respectively provided by the pixel electrode 604 and the common electrode 404 makes the liquid crystal molecules 511 arrange perpendicular to the two substrates 400, 600. Thus the light cannot penetrate the AMLCD panel 20 in a region above the second shield metal line 621 when a black image is provided to the display screen of the AMLCD panel 20.

In an alternative embodiment of the present invention, the first grooves of the first alignment layer 402 extend along a half past four o'clock direction, and the second grooves of the second alignment layer 603 extend along a half past seven o'clock direction. Thus an optical viewing angle of the AMLCD panel 20 extends along a nine o'clock direction. The second shield metal line 621 is electrically connected to the common lines 616 and the first shield metal line 620 is floating. That is, the first shield metal line 620 is not connected electrically to any other component or device.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An active matrix liquid crystal display (AMLCD) panel comprising:
    a first substrate comprising:
        a common electrode layer; and
        a first alignment layer formed on the common electrode layer, the first alignment layer having a plurality of first grooves that extend along a ten o'clock direction when the AMLCD panel is viewed from above;
    a second substrate comprising:
        a second alignment layer, the second alignment layer having a plurality of second grooves that extend along a one o'clock direction when the AMLCD panel is viewed from above:
        a plurality of gate lines that are parallel to each other and that each extend along a first direction;
        a plurality of common lines that are arranged parallel to and alternate with the gate lines; and
        a plurality of data lines that are parallel to each other and that each extend along a second direction different from the first direction, the data lines crossing the gate lines to define a plurality of pixel regions, each of the pixel regions comprising:
            a pixel electrode positioned between the data lines;
            a first shielding metal line positioned at a side of the pixel electrode; and
            a second shielding metal line positioned at another side of the pixel electrode, the second shielding metal line connected to the common line;
            wherein the first shielding metal line is electrically isolated from all the other components of the second substrate; and
    a liquid crystal layer sandwiched between the two substrates.

2. The AMLCD panel as claimed in claim 1, further comprising a color filter unit film formed at an internal surface of the first substrate that is nearest to the liquid crystal layer.

3. The AMLCD panel as claimed in claim 2, wherein the color filter unit film comprises a plurality of red color filter units, a plurality of green color filter units, and a plurality of blue color filter units.

4. The AMLCD panel as claimed in claim 3, further comprising a black matrix formed at the internal surface of the first substrate that is nearest to the liquid crystal layer, wherein the red color filter units, the green color filter units and the blue color filter units are separated from each other by the black matrix.

5. The AMLCD panel as claimed in claim 4, wherein the black matrix is made of a material selected from a group consisting of chromium and chromium oxide.

6. The AMLCD panel as claimed in claim 5, wherein the common electrode layer is formed on the black matrix and the color filter unit film.

7. The AMLCD panel as claimed in claim 1, wherein each of the pixel regions further comprises a thin film transistor (TFT) provided in the vicinity of a respective point of intersection of one of the pair of gate lines and one of the pair of data lines.

8. The AMLCD panel as claimed in claim 7, wherein the TFT comprises a gate electrode connected to one of the pair of gate lines, a source electrode connected to one of the pair of data lines, and a drain electrode connected to the pixel electrode.

9. The AMLCD panel as claimed in claim 8, wherein each of the pixel regions further comprises a through hole configured for connecting the pixel electrode and the drain electrode of the TFT.

10. The AMLCD panel as claimed in claim 1, further comprising a first polarizer formed at an outside surface of the first substrate, and a second polarizer formed at an outside surface of the second glass substrate.

11. The AMLCD panel as claimed in claim 1, wherein the first shield metal line partly overlaps the pixel electrode to form a first capacitor.

12. The AMLCD panel as claimed in claim 1, wherein the first shield metal line and the second shield metal line are made of material selected from a group consisting of molybdenum-tungsten alloy, chromium, and molybdenum.

13. The AMLCD panel as claimed in claim 1, wherein the common lines are made of a transparent material selected from the group consisting of ITO (Indium-Tin Oxide) and IZO (Indium-Zinc Oxide).

14. The AMLCD panel as claimed in claim 1, wherein the first and the second substrates are glass substrates.

15. The AMLCD panel as claimed in claim 1, wherein the first and the second substrates are silicon oxide substrates.

16. An active matrix liquid crystal display (AMLCD) panel comprising:
  a first substrate comprising:
    a common electrode layer; and
    a first alignment layer formed on the common electrode layer, the first alignment layer having a plurality of first grooves that extend along a ten o'clock direction when the AMLCD panel is viewed from above;
  a second substrate comprising:
    a second alignment layer, the second alignment layer having a plurality of second grooves that extend along a one o'clock direction when the AMLCD panel is viewed from above;
    a plurality of gate lines that are parallel to each other and that each extend along a first direction;
    a plurality of common lines that are arranged parallel to and alternate with the gate lines; and
    a plurality of data lines that are parallel to each other and that each extend along a second direction different from the first direction, the data lines crossing the gate lines to define a plurality of pixel regions, each of the pixel regions comprising:
      a pixel electrode positioned between the data lines;
      a first shielding metal line positioned at a side of the pixel electrode; and
      a second shielding metal line positioned at another side of the pixel electrode, the second shielding metal line connected to the common line;
      wherein the first shielding metal line is floating and cannot receive any voltage; and
  a liquid crystal layer sandwiched between the two substrates.

* * * * *